US012707248B2

(12) United States Patent
Le Scouarnec et al.

(10) Patent No.: US 12,707,248 B2
(45) Date of Patent: Aug. 11, 2026

(54) METHOD FOR CONTROLLING THE ROAMING OF A MOBILE STATION OPERATING A DOWNLOAD AND A RENDERING OF A VIDEO CONTENT, AND SYSTEM EXECUTING THE METHOD

(71) Applicant: BROADPEAK, Cesson Sevigne (FR)

(72) Inventors: Nicolas Le Scouarnec, Cesson Sevigne (FR); Tuan Tran, Cesson Sevigne (FR)

(73) Assignee: BROADPEAK, Cesson Sevigne (FR)

( * ) Notice: Subject to any disclaimer, the term of this patent is extended or adjusted under 35 U.S.C. 154(b) by 437 days.

(21) Appl. No.: 18/230,478

(22) Filed: Aug. 4, 2023

(65) Prior Publication Data

US 2024/0064502 A1 Feb. 22, 2024

(30) Foreign Application Priority Data

Aug. 18, 2022 (EP) .................................... 22306237

(51) Int. Cl.
*H04W 8/00* (2009.01)
*H04N 21/222* (2011.01)
(Continued)

(52) U.S. Cl.
CPC .......... *H04W 8/02* (2013.01); *H04N 21/2223* (2013.01); *H04N 21/41407* (2013.01); *H04N 21/44004* (2013.01)

(58) Field of Classification Search
CPC ............... H04W 8/02; H04W 21/2223; H04W 21/41407; H04W 21/44004
See application file for complete search history.

(56) References Cited

U.S. PATENT DOCUMENTS

2005/0243714 A1* 11/2005 Moon ................... H04W 72/30 370/216
2010/0136977 A1* 6/2010 Gazzard ................ H04W 36/08 455/436
(Continued)

FOREIGN PATENT DOCUMENTS

WO WO-2017095276 A1 * 6/2017 ........... H04L 47/283

OTHER PUBLICATIONS

Ko et al., "A handover-aware seamless video streaming scheme in heterogeneous wireless networks," Ann. Telecommun., 2014, vol. 69, pp. 239-250.
(Continued)

*Primary Examiner* — Khai M Nguyen
(74) *Attorney, Agent, or Firm* — Williams Mullen; R. Brian Drozd

(57) ABSTRACT

A mobile station is configured to operate a reception of audio and/or visual content from a remote server of audio and/or visual contents connected to the network and to operate restitution of the audio and/or visual content, the content transiting, between the reception and the restitution, via a data reception buffer of the mobile station. The method includes i) triggering a sending, to a roaming management device of the network, of a first piece of information according to which roaming of the mobile station is prohibited, when a first quantity of data available in the reception buffer, lower than a first predetermined threshold, is detected, then, ii) triggering a sending, to the roaming management device, of a second piece of information according to which roaming of the mobile station is authorized, when a second quantity of data available in the reception buffer, greater than a second predetermined threshold, is detected.

15 Claims, 5 Drawing Sheets

(51) Int. Cl.
*H04N 21/414* (2011.01)
*H04N 21/44* (2011.01)
*H04W 8/02* (2009.01)

(56) References Cited

U.S. PATENT DOCUMENTS

2016/0065995 A1* 3/2016 Phillips ............ H04N 21/25841 725/62
2016/0165475 A1* 6/2016 Kim ...................... H04W 28/16 370/253
2017/0013493 A1* 1/2017 HomChaudhuri .... H04W 36/08
2020/0015140 A1* 1/2020 Nam ..................... H04W 12/08
2021/0014762 A1 1/2021 Ramkull et al.
2021/0045039 A1 2/2021 Lee et al.
2022/0022027 A1* 1/2022 Xin ......................... H04W 8/12
2022/0039192 A1* 2/2022 Palat ................. H04W 12/0431
2022/0303331 A1* 9/2022 Svennebring ......... H04L 65/752

OTHER PUBLICATIONS

Feb. 15, 2023 Extended Search Report issued in European Patent Application No. 22306237.3.

* cited by examiner

METHOD FOR CONTROLLING THE ROAMING OF A MOBILE STATION OPERATING A DOWNLOAD AND A RENDERING OF A VIDEO CONTENT, AND SYSTEM EXECUTING THE METHOD

TECHNICAL FIELD

The present invention relates to communication networks offering mobile electronic devices, called mobile stations, wireless connections, via wireless access point devices. The invention relates more particularly to the management of the roaming of a mobile station operating a transfer of at least one audio and/or visual content to be rendered by itself or by a rendering equipment connected to this mobile station.

RELATED ART

Wireless communications have been developed a lot and most electronic devices, often mobile, are now connected to a network, or interconnected, through devices such as wireless access points or mobile phone telecommunication relays. Many mobile electronic devices are configured to be able to receive audio and/or visual contents transferred from one or more remote content servers connected to the same communication network as the one to which they are connected.

However, the roaming of a mobile station in a communication network requires interruptions in the transfer of audio and/or visual content being rendered, if necessary, which possibly leads to an interruption in the rendering of an audio and/or visual content, depending on the quantity of data, representative of the audio and/or visual content to be rendered, in a reception buffer of the mobile station. An interruption in the rendering of an audio and/or visual content is always very unpleasant for a user. Document US2010/136977A1 relates to a mobile station for receiving delay-sensitive data from a wireless communications network, comprising a cell reselection controller. The situation can be improved.

SUMMARY OF THE INVENTION

The aim of the invention is to optimize the quality of supply of audio and/or visual content between an audio and/or visual content server and a mobile station connected to the same communication network by conditioning the roaming of the mobile station between two wireless access points of this network, according to the ability of the mobile station to render the audio and/or visual content regarding the level of filling of its reception data buffer.

To this end, it is proposed a method for handling (managing) the roaming of a mobile station connected to a wireless access point among a plurality of wireless access points of a communication network, said mobile station being configured to operate a reception of an audio and/or visual content from a remote server of audio and/or visual contents connected to said communication network and to operate a rendering of said audio and/or visual content, said audio and/or visual content transiting, between said reception and said rendering, via a data reception buffer of said mobile station, the method being executed in a device connected to said communication network and comprising:

- triggering a sending, to a roaming management device of said communication network, of a first piece of information according to which roaming of said mobile station is prohibited, when a first quantity of data available in said reception buffer, lower than a first predetermined threshold, is detected, then,
- triggering a sending, to said roaming management device, of a second piece of information according to which roaming of said mobile station is authorized, when a second quantity of data available in said reception buffer, greater than a second predetermined threshold, is detected.

According to one embodiment, the method for handling the roaming of a mobile station as described above is such that said device connected to said communication network is said mobile station or said device connected to said communication network is said remote server.

According to one embodiment, the method for handling the roaming of a mobile station as described above is such that:

- the sending of said first piece of information to said roaming management device is broken down in:
- a sending, to a transfer supervision device of audio and/or visual contents in said communication network, of a piece of information according to which the first quantity of data available in said reception buffer, less than a predetermined threshold, is detected, and,
- a sending, from said transfer supervision device of audio and/or visual contents in said communication network, to said management roaming device, of said first information according to which roaming of said mobile station is prohibited, and,

- the sending of the second piece of information to said roaming management device is broken down in:
- a sending, to the transfer supervision device of audio and/or visual contents in said communication network, of a piece of information according to which the second quantity of data available in said reception buffer, greater than a predetermined threshold, is detected, and,
- a sending, from said transfer supervision device of audio and/or visual contents in said communication network, to said management roaming device, of said second information according to which roaming of the mobile station is authorized.

Another object of the invention is a method for handling the roaming of a mobile station connected to a wireless access point among a plurality of wireless access points of a communication network, said mobile station being configured to operate a reception of an audio and/or visual content from a remote server of audio and/or visual contents connected to said communication network and to operate a rendering of said audio and/or visual content, said audio and/or visual content transiting, between said reception and said rendering, via a data reception buffer of said mobile station, said method comprising a method as described above and further comprising the following steps, executed in said roaming management device:

- receiving said first information according to which roaming of said mobile station is prohibited, then,
- inhibiting an ability of said mobile station to roam in said communication network for a predetermined duration or until reception of said second information according to which a roaming of said mobile station is allowed, then,
- authorizing said mobile station to roam in said communication network.

According to an embodiment, the step of inhibiting an ability of said mobile station to roam in said communication network comprises:

identify one or more wireless access points of the communication network located within range of said mobile station, different from the wireless access point to which the mobile station is connected, triggering, upon receipt of the first information, the sending of a first configuration message, to each of said identified wireless access point devices, comprising information according to which a connection of the mobile station to this wireless access point is not allowed, then, triggering, after said predetermined duration, or upon receipt of said second information, the sending of a second message, to each of said identified wireless access point devices, comprising information according to which a connection of the mobile station to this wireless access point is allowed.

Another object of the invention is a device configured to be connected to a communication network, said communication network comprising a mobile station configured to be connected to a wireless access point among a plurality of wireless access points of said communication network, and configured to operate a reception of an audio and/or visual content delivered from a remote server of audio and/or visual contents connected to said communication network and to operate a rendering of said audio and/or visual content, said audio and/or visual content transiting, between said reception and said rendering, via a data reception buffer of the mobile station, said device comprising electronic and electromagnetic circuits configured to:

triggering a sending, to a roaming management device of said communication network, of a first piece of information according to which roaming of said mobile station is prohibited, when a first quantity of data available in said reception buffer, less than a first predetermined threshold, is detected, and for:

triggering a sending, to said roaming management device, of a second piece of information according to which roaming of said mobile station is authorized, when a second quantity of data available in said reception buffer, greater than a second predetermined threshold, is detected.

According to an embodiment, said device connected to said communication network is said mobile station or is said remote server.

Another object of the invention is a system for handling the roaming of a mobile station connected to a wireless access point among a plurality of wireless access points of a communication network, said mobile station being configured to operate the reception of audio and/or visual content delivered from a remote server of audio and/or visual contents connected to said communication network and to operate a rendering of said audio and/or visual content, said audio and/or visual content transiting, between said reception and said rendering, via a data reception buffer of the mobile station, said system comprising a device as described here-above and further comprising a roaming management device comprising electronic circuitry configured to:

receiving said first information according to which roaming of said mobile station is prohibited, and for:

inhibiting an ability of said mobile station to roam in said communication network for a predetermined duration or until receipt, from said device as described here-above, of said second information according to which roaming of said mobile station is authorized, and then, authorizing again the roaming of the mobile station.

The invention also relates to an audio and/or visual content transfer supervision device in a communication network, from an audio and/or visual content server connected to said communication network to at least one mobile station connected to said communication network, the audio and/or visual content transfer supervision device comprising a connection interface to the communication network and electronic circuits configured for:

receiving, from at least a device connected to said communication network, information that a first quantity of data available in a reception data buffer of said mobile station for receiving said audio and/or visual content, below a predetermined threshold, is detected, and for:

sending, to a roaming management device, first information according to which roaming of said mobile station in said communication network is prohibited, the audio and/or visual contents transfer supervision device further comprising electronic circuits configured for:

receiving, from said device connected to said communication network, information that a second quantity of data available in said reception data buffer of said mobile station, for receiving said audio and/or visual content, greater than a predetermined threshold, is detected, and for:

sending, to said roaming management device, a second piece of information according to which roaming of said mobile station in said communication network is authorized.

Another object of the invention is a system for handling the roaming of a mobile station as previously described, further comprising an audio and/or visual content transfer supervision device as described here-above.

The invention also relates to a system for handling the roaming of a mobile station as described above, wherein the roaming management device and the audio and/or visual content transfer supervision device are included in a same equipment, preferably a home network gateway device.

Advantageously, the system for handling the roaming of a mobile station can be configured such that said roaming management device and said audio and/or visual contents transfer supervision device are respectively embedded in separate equipment.

According to an embodiment, the system for handling the roaming of a mobile station described hereabove is such that said roaming management device and said audio and/or visual contents transfer supervision device are each embedded in an equipment of a communication network configured to operate communications according to a set of standards and interoperability protocols such as one among 3G, 4G or 5G.

According to an embodiment, the system for handling the roaming of a mobile station is such that said roaming management device and said audio and/or visual contents transfer supervision device are included in a same equipment, of the home gateway type.

The invention also relates to a computer program product comprising program code instructions for executing the steps of the described roaming management method when said program is executed by a processor, and an information storage medium comprising such a computer program product.

BRIEF DESCRIPTION OF THE DRAWINGS

The characteristics of the invention mentioned above, as well as others, will appear more clearly on reading the following description of at least one embodiment, said description being made in relation to the attached drawings, among which.

DETAILED DESCRIPTION OF AT LEAST ONE EMBODIMENT

Figure 1:
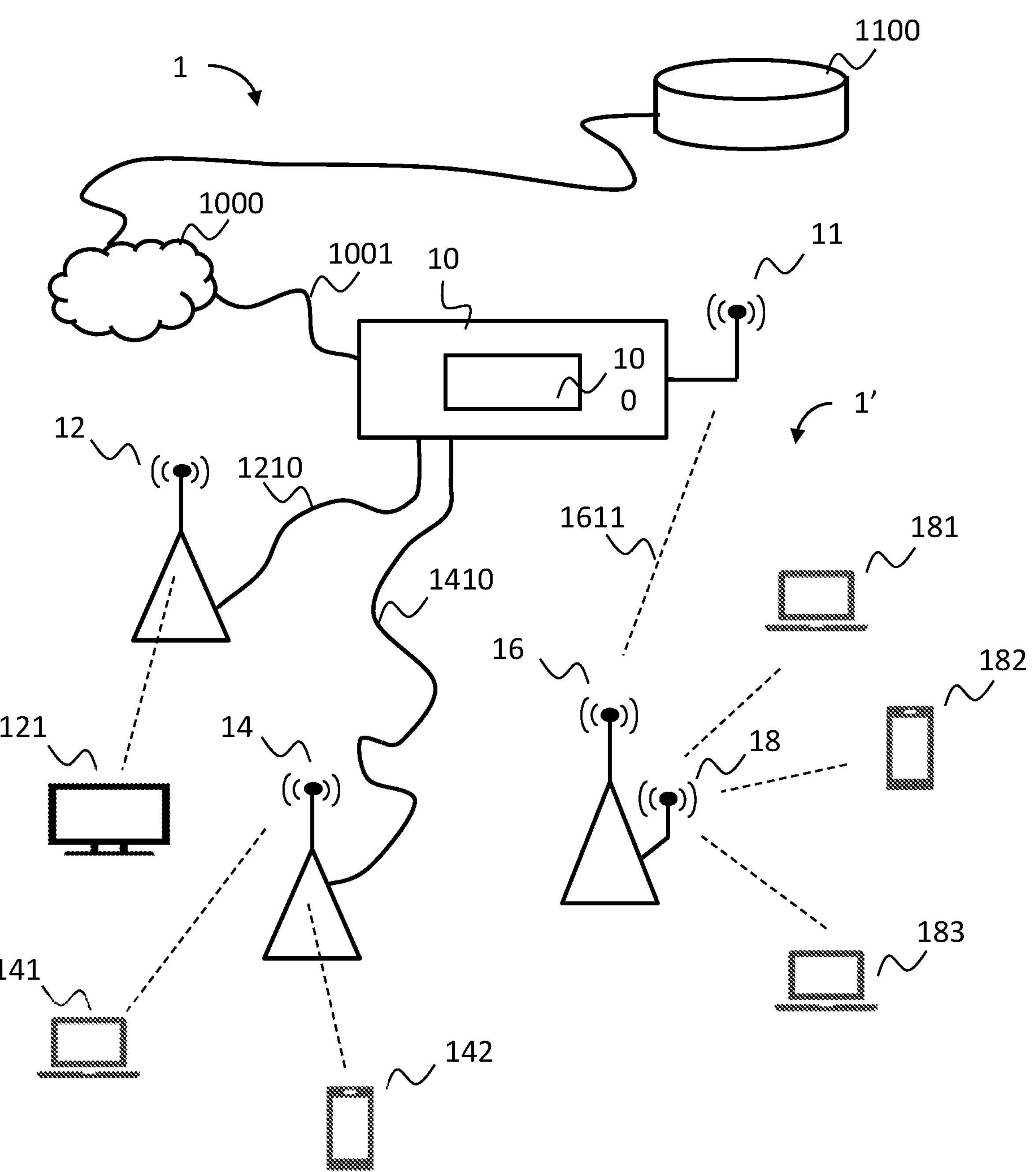
FIG. 1 schematically illustrates a communication network in which a method for managing the roaming of a mobile station is implemented, according to one embodiment.

FIG. 1 schematically illustrates a communication network 1. The communication network 1 comprises for example a local home network 1' comprising a network gateway device 10, typically of the residential network gateway type, connected to an extended network 1000. The network gateway 10 is configured for the connection of the home local network 1' to the wide area network 1000, via a connection link 1001. The wide area network 1000 is a commonly named "WAN" (Wide Area Network) type network. According to one embodiment, the wide area network 1000 is the Internet network. The connection link 1001 can be implemented in the form of a telephone subscriber line, and the connection uses for example ADSL technology (acronym for "Asymmetric Digital Subscriber Line"), a fiber optic type connection or even a wireless link of the fixed wireless access type or "fixed wireless access" based on 4G and/or 5G access technologies for example. These examples are not limiting. Some electronic devices 121, 141, 142, 181, 182 and 183, of different types, are configured to be connected to the local home network 1' and more broadly to the network 1 via the network gateway 10. Thus, the electronic device 121 of the high-definition television type, is connected to the network gateway 10 via a wireless access point device 12, itself connected to the network gateway 10 via a wired connection 1210. The electronic device 141 is a portable computer (or laptop) whose data and control link are connected to the local home network 1' via a wireless access point device 14, which one is connected to the gateway network 10 via a wired link 1410. The wired link 1210 and link 1410 are for example of the Ethernet type. An electronic device 142 of the smartphone type is also connected to the network gateway 10 via the wireless access point device 14. The electronic devices 181, 182 and 183, respectively of the portable computer (or laptop), smart telephone (or smartphone) and portable computer type, are connected wirelessly to a wireless access point device 18, itself connected to a wireless access point device 16 operating a wireless connection 1611 with the network gateway 10. The wireless connection 1611 between the wireless access point 16 and the network gateway 10 is made through a wireless access point device 11 embedded in the network gateway 10. The connection between wireless access point devices 16 and 18 is an internal wired link. Indeed, the wireless access point devices 16 and 18 are included in the same and single equipment of the WiFi wireless repeater type. According to one embodiment, all the devices represented are configured or configurable to operate wireless communications according to an IEEE 802.11 standard (a, b, g, n, ac, ax) or any of its evolutions. The wireless access point device 11 of the network gateway 10 is connected to an internal communication module 115 of the network gateway 10 configured for wired connections and wireless connections (not shown in FIG. 1 but visible on FIG. 5). The communication module 115 also controls the internal wired interfaces of the network gateway 10, and therefore partly the wired connections 1210 and 1410.

The terms "wireless access point device" are to be interpreted in this description as referring to a radio communication interface, usually referred to as a radio.

The network gateway 10 further comprises a roaming management device 100 configured to operate roaming control, in the home local network 1', of the wireless access point devices 11, 12, 14, 16 and 18, that is to say to determine under which condition(s) an electronic device, also called a mobile station in the present description, can see its connection switch from a first wireless access point of the local home network 1' to a second access point of the local home network 1'. In the rest of the description, the term "roaming" designates the connection switching of a mobile station from a first wireless access point to a second wireless access point and the term "capacity of roaming" refers to a capacity to operate such a switchover.

Advantageously, the roaming management device 100 is adapted to analyze at regular intervals the data transmission conditions at different points of the local home network 1', so as to determine whether there are problems with bandwidth, quality of connection of any malfunctions, to possibly force mobile stations to connect to a wireless access point rather than to one or more other wireless access points and to correct any detected malfunctions. Similarly, and in the absence of a critical problem, the roaming management device 100 can force a mobile station to switch its connection to a predefined wireless access point to balance the load in the different branches of the local home network. 1'.

According to an exemplary embodiment, the roaming management device 100 implements access management functions for mobile stations to a communication network compatible with an IEEE 802.11k, IEEE 802.11v or IEEE 802.11r standard. These standards are all designed to improve the roaming of mobile stations when they are moved in a communications network comprising wireless access points carrying out communications according to an IEEE 802.11 standard. For example, with the IEEE 802.11k standard, a wireless access point can respond to a neighborhood report request from a mobile station to reduce time spent analyzing the radio frequency environment. With the IEEE 802.11v standard, a wireless access point can make an assessment of the connection quality with a mobile station and direct a station to a better wireless access point in the communication network, by balancing the load between the different wireless access points. The IEEE 802.11r standard makes it possible to reduce the authentication time between a mobile station and a wireless access point of the communication network. Advantageously, the roaming management device 100 can supervise all the wireless access points and operate configurations to allow the connection of a determined mobile station to only one or more of the available wireless access points in the communication network 1, or even to none of them for a determined duration or according to predetermined conditions.

Cleverly, according to one embodiment, each of the mobile stations of the communication network 1, configured to roam between two wireless access points of the communication network 1, under the supervision (control) of the roaming management device 100, and to receive audio and/or visual content from a remote server such as the remote server 1100, with a view to render this audio and/or visual content on means specific to the mobile station or means connected to this mobile station, is configured in addition to scrutinize (monitor) the quantity of data in reception in a buffer area of memory (here called "buffer") used for the reception of the data which constitutes the audio and/or visual content received and to be rendered. A mobile station thus configured can detect when the quantity of data available in the buffer used in reception is less than a first predetermined threshold for which quality of rendering cannot be guaranteed and can also detect when the quantity of data available in the buffer area used in reception is greater than a second predetermined threshold for which a good quality of rendering can be guaranteed. According to one embodiment, the first and second thresholds are distinct. According to a variant, the first and second thresholds are identical, but the scanning carried out distinguishes a crossing of the threshold when the quantity of data available decreases (emptying of the buffer) and a crossing of the threshold when the quantity of data available increases (filling of the buffer). Thus, a mobile station can astutely trigger a sending, to the roaming management device 100 of the communication network 1, of a first piece of information according to which roaming of the mobile station is prohibited, when the first quantity of data available in the buffer in reception, lower than the first predetermined threshold, is detected, so that the roaming management device 100 can take configuration measures aimed at inhibiting the roaming capacity of the mobile station concerned, in the network of communication 1, this in order to avoid a concomitance between an empty or almost empty buffer and an interruption of the transfer of audio and/or visual content due to roaming, since such a situation would in fact lead to an interruption of the rendering of the audio and/or visual content which is received and rendered.

According to an inverse principle, a mobile station can astutely trigger a sending, to the roaming management device 100 of the communication network 1, of a second piece of information according to which roaming of the mobile station is authorized or authorized again, when the second quantity of data available in the reception buffer, greater than the second predetermined threshold, is detected, so that the roaming management device 100 can take configuration measures aimed at authorizing roaming of the mobile station concerned in the communications network 1; this in order to guarantee the availability of a sufficient quantity of data in reception (in the reception buffer), to be processed, to operate a rendering of the audio and/or visual content without interruption, during a roaming of the mobile station between two wireless access points of the communication network 1.

According to a variant embodiment, the communication network 1 further comprises an audio and/or visual content transfer supervision device 150, configured to supervise, that is to say to manage and control, a set of audio and/or visual content transfers between one or more audio and/or visual content servers, such as the server 1100, and one or more mobile stations of the communication network 1. The transfer management device 150 then advantageously makes it possible to supervise the network load according to the transfers of audio and/or visual contents in progress and to operate or request configurations aimed, for example, at modifying the resolution of the audio and/or visual content to be provided, at distributing the supply on several routes through the communication network, to pool routes in the communication network, or to carry out any configuration of one or more elements of the communication network 1 aimed at optimizing the transfers of audio and/or visual contents in progress or to come. The examples described here are not limiting.

Advantageously and according to a variant embodiment, the sending of the first piece of information according to which the roaming of a mobile station is prohibited, taking into account the low level of data available in a reception buffer of this mobile station, is then broken down in a sending to the audio and/or visual contents transfer supervision device 150 of information according to which the first quantity of data available in the reception buffer of the mobile station, lower than a first predetermined threshold, is detected, then a sending, from the transfer supervision device 150 to the roaming management device 100, of the first information according to which roaming of the mobile station concerned is prohibited in the communication network 1.

Similarly, and in the presence of the transfer supervision device 150, the sending of the second piece of information according to which the roaming of a station is authorized or authorized again, taking into account the level of available data which has again become sufficient in the reception buffer of the mobile station concerned, is then broken down into a sending to the transfer supervision device 150 of information according to which the second quantity of data available in the reception buffer, greater than a second predetermined threshold, is detected, then a sending, from the transfer supervision device 150 to the roaming management device 100, of the information according to which roaming of the mobile station concerned is authorized, or again authorized, in the communication network 1.

According to another embodiment, triggering the sending of pieces of information informing of the filling level of the reception buffer of the mobile station 142, and thus according to which the roaming of the mobile station 142 is prohibited or not, is not carried out by the mobile station 142 itself, but by any other electronic or computer device connected to the communication network 1 and capable of knowing or predicting the filling level of the reception buffer of the mobile station 142. Cleverly, such an electronic device triggering the sending of pieces of information informing about the filling level of the reception buffer of the mobile station 142 may be a part of the content server 1100 itself. For example, the content server 1100 can itself transmit such pieces of information insofar as it is able to predict the filling level of the reception buffer of the mobile station 142, or of any mobile station connected to the communication network 1 and which receives content from it. To do this, the content server 1100 can for example use a learning method of the machine learning type which takes into account various operating parameters observed over time and which jointly characterize the way in which a mobile station behaves in the process of download an audio and/or video content.

According to another embodiment, triggering the sending of pieces of information aimed at informing of the level of filling of the buffer in reception of the mobile station 142, and thus according to which the roaming of the mobile station 142 is prohibited or not, is carried out by any electronic or computer device connected to the communication network 1 and configured to simulate the behavior of the mobile station 142 when the latter downloads audio and/or video content from the content server 1100, by considering the state of the communication network 1 in real time (the conditions of bit rate, latency, etc.).

These embodiments are not limiting and more generally, the electronic or computer device triggering the sending of pieces of information aimed at informing of the level of filling of the buffer in reception of the mobile station 142 can be any device connected to the communication network 1 and configured to know, to determine or to predict the level of filling of the reception buffer of the mobile station 142.

Figure 2:
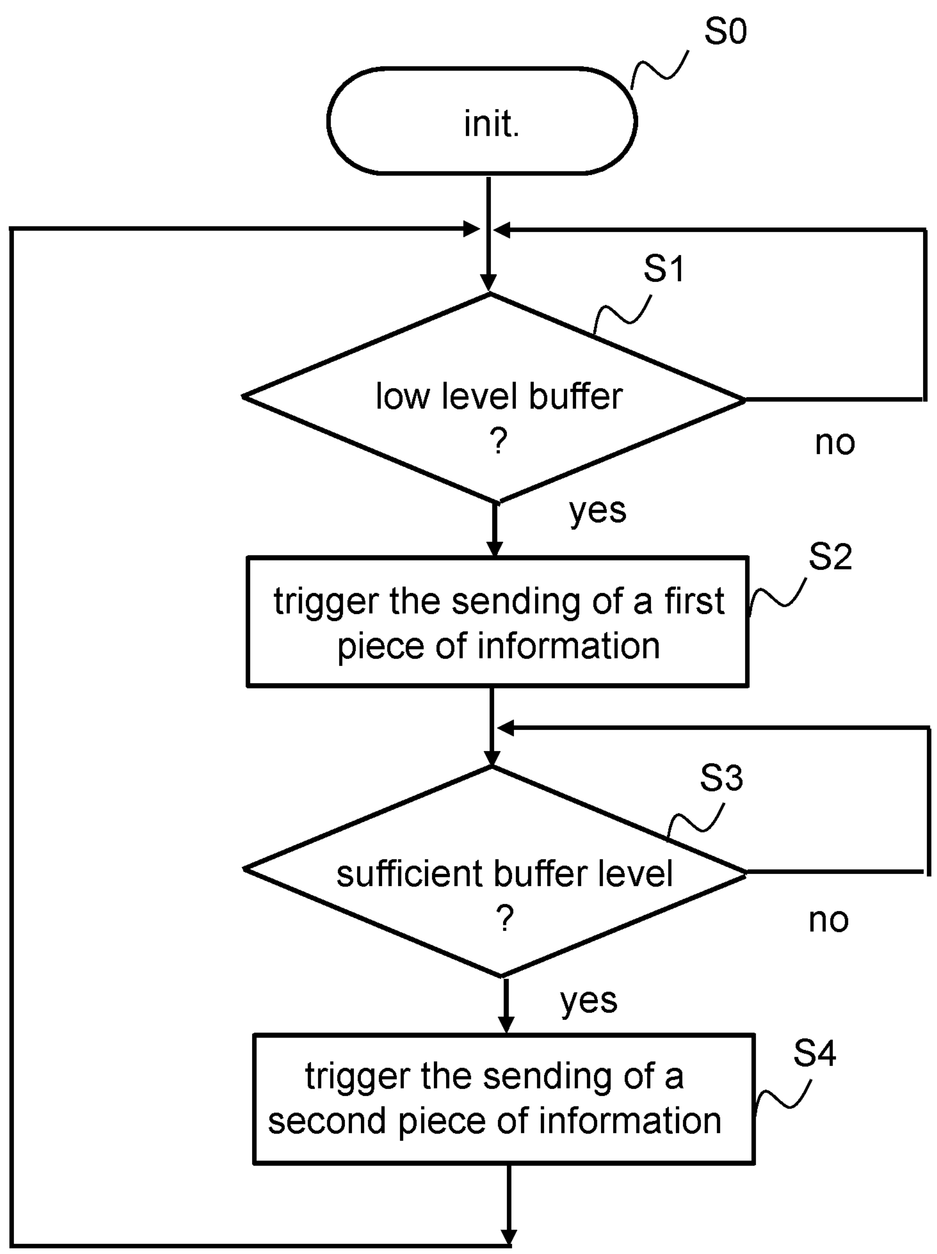
FIG. 2 is a flowchart representing the steps of a mobile station roaming management method implemented in a mobile station connected to the communication network illustrated in FIG. 1.

FIG. 2 illustrates a method for configuring or reconfiguring wireless access point devices according to one embodiment of the invention aimed at authorizing or inhibiting roaming of a mobile station in the communication network 1. A step S0 corresponds to a state in which the electronic devices connected to the local area network 1 are operational and configured to interact with each other nominally. In particular, the network gateway 10 is configured so as to allow the electronic devices 121, 141, 142, 181, 182 and 183, of different types, to connect to the local network 1 of LAN type. In addition, the network gateway 10 is configured to connect the local network 1 to the extended network 1000, the roaming management device 100, embedded in the network gateway 10 or, according to a variant, in a remote cloud server or in any equipment of the communication network 1, is configured to offer services for the optimized configuration of the various wireless access points 11, 12, 14, 16 and 18 aimed at authorizing or not the connection of a station to each of the various wireless access points. In addition, the wireless access point devices 11, 12, 14, 16 and 18 are initialized and configured to offer usual connection services to the local area network 1 and to be able to detect each of the information representative of the electromagnetic environment in the space around it, i.e., within its electromagnetic range. Thus, step S0 corresponds to nominal operation of the local network 1 comprising the aforementioned devices and also operating communications from and to the extended network 1000 through the network gateway 10.

A step S1 constitutes a step of monitoring, by a mobile station, the quantity of data available in the reception buffer of this mobile station receiving audio and/or visual content from the remote server 1100 of audio and/or visual contents, for the purpose of rendering this audio and/or visual content via rendering (playback) means of the mobile station or via rendering means connected to the mobile station. The reception buffer (reservoir) is a memory area of the mobile station dedicated to the reception of data packets successively received and which encode the audio and/or visual content being received and rendered (played back). According to one embodiment, the coding is conventional and comprises video data packets coding images or modified portions of images as well as audio packets coding an audio signal representative of an acoustic environment. Thus, for example, the reception buffer comprises numerous types of packets, audio, video and control, before demultiplexing by means embedded in the mobile station. In this sense, the reception buffer is a memory area conventionally named buffer in a reception system as a mobile station configured for audio and/or visual content rendering with the audio and/or visual content downloaded from a remote server. According to an embodiment, the reception buffer is structured as a circular buffer whose management is based on a write address pointer and a read address pointer, and the first minimum threshold of quantity of data available as well as the second minimum available data threshold is defined with reference to the difference between the data write pointer address and the data read pointer address. According to another embodiment, the reception buffer has a FIFO (First-In-First-Out) type architecture, and the write address of a data item on arrival varies according to the reading speed in the buffer, depending on the processing speed during operations subsequent to the reception of the data. Thus, during step S1, the mobile station monitors the quantity of data so as to continuously determine whether the quantity of data available in the reception buffer is, or becomes, lower than a predetermined threshold of quantity of data. If this is the case, the mobile station triggers the sending, to the roaming management device 100, during a step S2, of a first item of information according to which a roaming of the station between two access points of the communication network 1 is prohibited. Otherwise, the monitoring process loops back to step S1. In the case where the quantity of data available in reception has been detected as being lower than the predetermined threshold during step S1, i.e., in other words that the level of filling of the buffer in reception has been insufficient, it is checked during a monitoring step S3 that the filling level of the buffer becomes sufficient to authorize roaming of the mobile station in the communication network 1. In other words, it is checked, during step S3, that the quantity of data available in reception in the reception buffer is greater than or becomes greater than a predetermined threshold. The latter may be different from the threshold used in step S1. In this case, it is then a first threshold at step S1 and a second threshold at step S2. In the event that the quantity of data available in the reception buffer remains below this threshold of step S3, the process for monitoring the quantity of data in reception loops back to step S3, and a new comparison is performed, otherwise, the mobile station triggers, during a step S4, the sending of a second piece of information according to which roaming of the station is authorized or authorized again. According to one embodiment, this sending to the roaming management device 100 includes a unique identifier of the mobile station, as well as information aimed at indicating that roaming of this station is authorized.

The method of scanning the quantity of data available on reception in the reception buffer of an audio and/or visual content of a mobile station of the communication network 1 thus constitutes a method of handling the roaming of this mobile station in the network of communication 1. In summary, when there is not enough data to process in the reception buffer of an audio and/or visual content to be rendered, the mobile station informs the roaming management device 100 that it renounces to any roaming since the processing to be carried out with a view to this roaming would possibly interrupt the reception link and would consequently lead to an interruption in the rendering of the audio and/or visual content, which is very unpleasant for a user who is watching the rendered audio and/or visual content.

Figure 3:
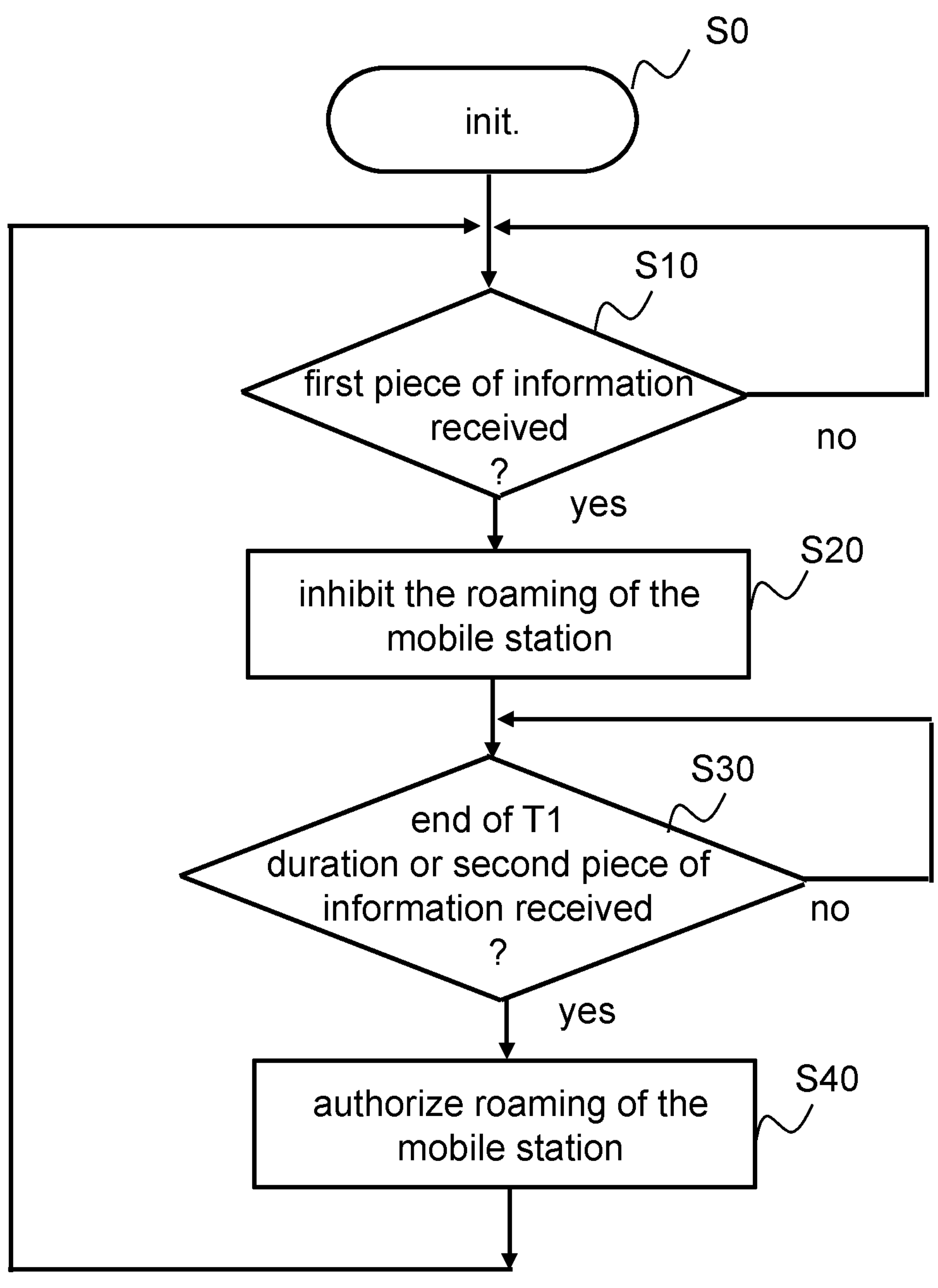
FIG. 3 is a flowchart representing the steps of a roaming management method of a mobile station implemented in a roaming management device of the communication network illustrated in FIG. 1.

FIG. 3 illustrates steps of the roaming management method executed in the roaming management device 100. Seen from the roaming management device 100, the roaming management method comprises the steps:

receive a first piece of information, from a mobile station of the communication network 1, according to which roaming of this mobile station is prohibited, then, inhibit a capacity of this mobile station to operate a roaming in the communication network 1 for a predetermined duration T1, for example several seconds, or until the reception of the second information, emitted from the mobile station, according to which a roaming of this mobile station is authorized, then, authorize roaming of this mobile station in the communication network 1.

Step S0 is the step for initializing all of the systems, already illustrated in the method described in relation to FIG. 2, at the end of which all the mobile stations connected to the communication network 1 are able to operate roaming between two wireless access points of the communication network 1 and at the end of which the roaming management device 100 waits, during a step S10, for the reception of first information from a mobile station, according to which roaming of this mobile station is prohibited. In the absence of receipt of such information, the method loops back to step S10 and remains awaiting such information. In the case where such information is received during step S10, the roaming management device 100, during a step S20, operates an inhibition of roaming capacities of the station having transmitted the information during step S10. For example, the roaming management device 100 registers a unique identifier of the mobile station having transmitted the information in a list of prohibited connection devices specific to each of the wireless access points of the communication network 1, except the wireless access point to which the mobile station is already connected. To do this, the roaming management device 100 sends successive messages to each of the wireless access points of the communication network 1 or at the very least to those identified as being within the electromagnetic range of the mobile station concerned. At the end of step S20, the mobile station having sent the first piece of information received during step S10 can no longer operate roaming, that is to say it can no longer operate a connection switchover from a first wireless access point of the communication network 1 to a second wireless access point of the communication network 1. The roaming management device 100 then places itself, during a step S30, in expectation of a second piece of information, according to which roaming is authorized, sent by the mobile station having previously sent the first piece of information, according to which a roaming was prohibited. In the absence of such information at step S30, the process loops back to step S30. Conversely, if such information is received in step S30, the roaming management device 100 performs, during a step S40, a configuration aimed at authorizing roaming of the mobile station again. To do this, the roaming management device 100 sends successive messages to each of the wireless access points of the communication network 1 for the purpose of removing the unique identifier of the mobile station concerned from the list of prohibited devices from connection in each of the wireless access points.

According to variants, other mechanisms for blocking the roaming of a mobile station can be used, using a similar principle of preventing connection to another wireless access point than the one to which the mobile station is already connected.

According to a mode of configuration, the first and second pieces of information are sent directly to the roaming management device 100, by the mobile station concerned.

According to a variant, and in the presence of an audio and/or visual content transfer supervision device in the communication network 1 (such as the supervision device 150), the mobile station sends information to the transfer supervision device, present in the communication network 1, according to which the quantity of data available in its reception buffer is respectively less than a predetermined threshold or greater than a predetermined threshold, and the transfer supervision device then sends, if necessary, the first piece of information according to which a roaming of this mobile station is prohibited, or the second information according to which roaming of this mobile station is authorized, to the roaming management device 100, depending on the quantity of data in the reception buffer of the mobile station.

Figure 4:
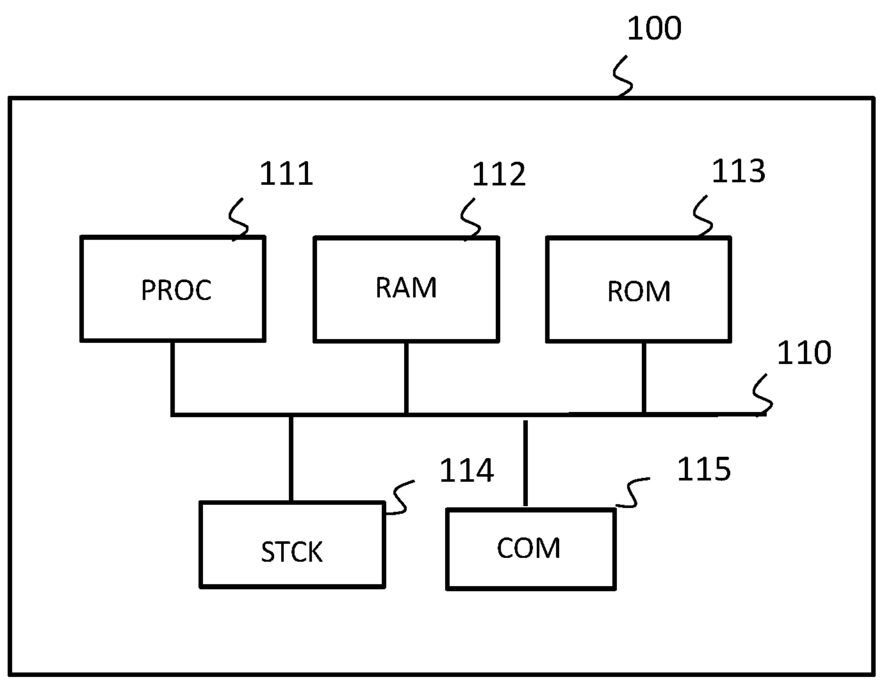
FIG. 4 illustrates an example of the architecture of a roaming management device connected to the communication network represented in FIG. 1 and in which a method described in relation to FIG. 3 is implemented.

FIG. 4 schematically illustrates an example of internal architecture of the roaming management device 100. It should be noted that FIG. 4 also schematically illustrates an example of hardware architecture of the digital core of the network gateway 10 comprising the roaming management device 100, or even an example of hardware architecture of a wireless access point device among the devices 11, 12, 14, 16 and 18.

According to the hardware architecture example shown in FIG. 4, the roaming management device 100 then comprises, connected by an internal communication bus 110: a processor or CPU (Central Processing Unit) 111; a random access memory (RAM) 112; a read only memory ROM (Read Only Memory) 113; a storage unit such as a hard disk (or a storage medium reader, such as an SD ("Secure Digital" in English) card reader 114; at least one communication interface 115 allowing the roaming management device 100 to communicate with devices present in the communication network 1, such as, for example, the wireless access point devices 11, 12, 14, 16 and 18, the mobile stations or the audio and/or visual contents transfer supervision device 150.

The processor 111 can execute instructions loaded into RAM 112 from ROM 113, external memory (not shown), storage medium (such as an SD card), or a communications network. When the roaming management device 100 is powered up, processor 111 can read instructions from RAM 112 and execute them. These instructions form a computer program causing the implementation, by the processor 111, of part of a method described in relation to FIG. 2 and FIG. 3.

All or part of the method implemented by the roaming management device 100, or its variants described, can be implemented in software form by executing a set of instructions by a programmable machine, for example a DSP (Digital Signal Processor" in English) or a microcontroller, or be implemented in hardware form by a machine or a dedicated component, for example an FPGA ("Field-Programmable Gate Array") or an ASIC ("Application-Specific Integrated Circuit" in English). In general, the roaming management device 100 includes electronic circuitry configured to implement the method described in relation to itself as well as to the wireless access point devices 11, 12, 14, 16 and 18, the mobile stations of the communication network 1, and any other device involved in performing the roaming management method described. Of course, the roaming management device 100, further comprises all the elements usually present in a system comprising a control unit and its peripherals, such as a power supply circuit, a supervision circuit supply, one or more clock circuits, a reset circuit, input-output ports, interrupt inputs, bus drivers. This list is obviously not exhaustive.

Figure 5:
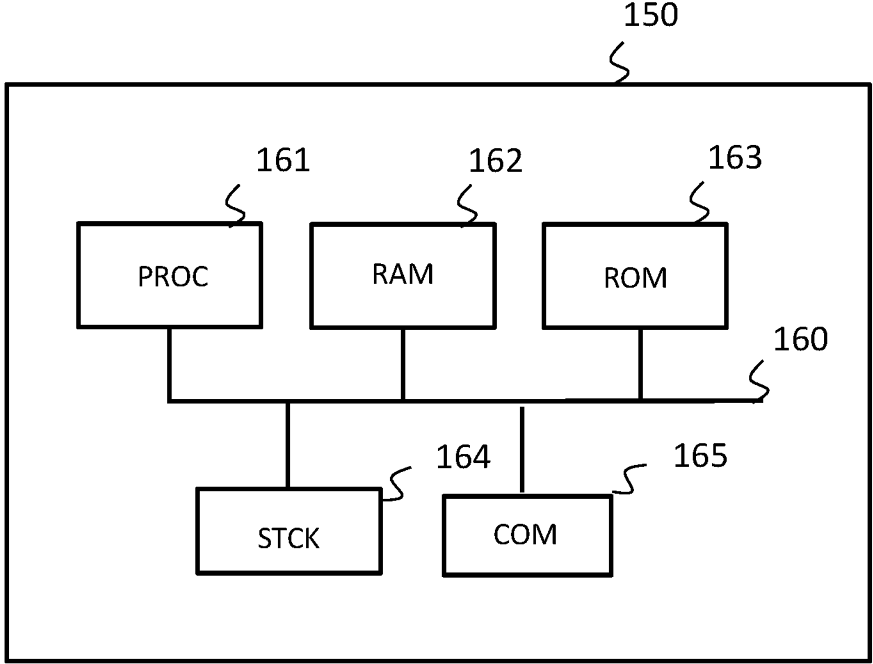
FIG. 5 illustrates an example of the architecture of an audio and/or visual content transfer supervision device of the communication network represented in FIG. 1 and in which steps of a roaming management method are executed; and, FIG. 6 illustrates an example of the architecture of a mobile station of the communication network represented in FIG. 1 and in which steps of a roaming management method in relation to FIG. 2 are implemented.

FIG. 5 schematically illustrates an example of internal architecture of the transfer supervision device 150 of audio and/or visual content.

According to the hardware architecture example shown in FIG. 5, the audio and/or visual content transfer supervision device 150 then comprises, connected by an internal communication bus 160: a processor or CPU (Central Processing Unit) 161; a random access memory (RAM) 162; a read-only memory ROM 163; a storage unit such as a hard disk (or a storage medium reader, such as an SD ("Secure Digital") card reader 164; at least one communication interface 165 enabling the supervision device to transfer 150 to communicate with devices present in the communication network 1, such as for example the wireless access point devices 11, 12, 14, 16 and 18, the mobile stations or the roaming management device 100.

The processor 161 is capable of executing instructions loaded into RAM 162 from ROM 163, external memory (not shown), storage medium (such as an SD card), or a communications network. When transfer supervisor 150 is powered up, processor 161 can read instructions from RAM 162 and execute them. These instructions form a computer program causing the implementation, by the processor 111, of part of a method described in relation to FIG. 2 and FIG. 3.

All or part of the method implemented by the roaming management device 100, or its variants described, can be implemented in software form by executing a set of instructions by a programmable machine, for example a DSP ("Digital Signal Processor") or a microcontroller, or be implemented in hardware form by a dedicated machine or component, for example an FPGA (Field-Programmable Gate Array) or an ASIC (Application-Specific Integrated Circuit). In general, the transfer supervision device 150 comprises electronic circuitry configured to implement the method described in relation to itself as well as to the wireless access point devices 11, 12, 14, 16 and 18, and any other device involved in performing the configuration process described. Of course, the audio and/or visual content transfer supervision device 150 further comprises all the elements usually present in a system comprising a control unit and its peripherals, such as a power supply circuit, a power supply supervision circuit, one or more clock circuits, a reset circuit, input-output ports, interrupt inputs, bus drivers. This list is obviously not exhaustive.

Figure 6:
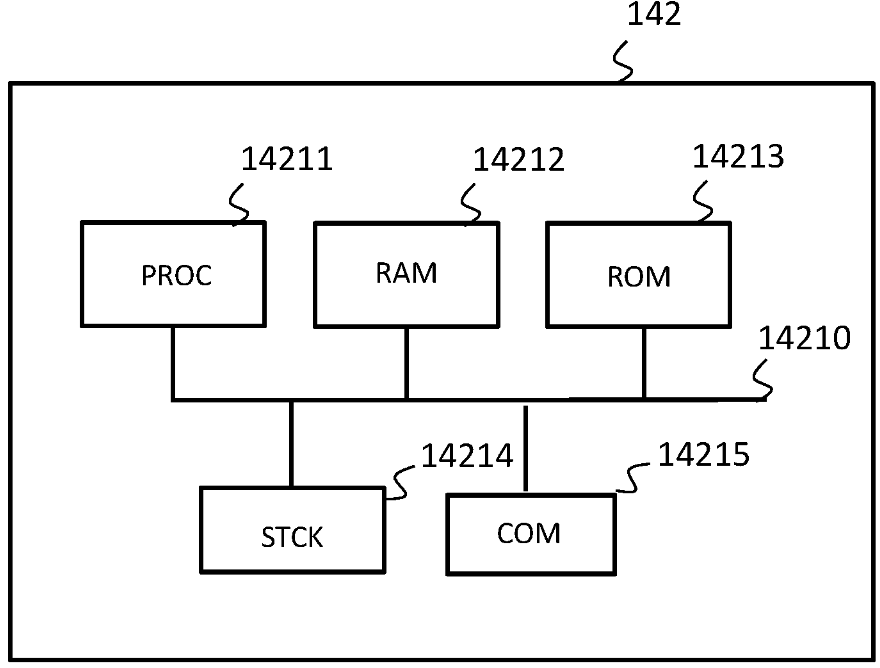

FIG. 6 schematically illustrates an example of internal architecture of a mobile station of the communication network 1, such as the mobile station 142.

According to the hardware architecture example shown in FIG. 6, the mobile station 142 then comprises, connected by an internal communication bus 14210: a processor or CPU (Central Processing Unit) 14211; a random access memory (RAM) 14212; a read only memory ROM (Read Only Memory) 14213; a storage unit such as a hard disk (or a storage medium reader, such as an SD ("Secure Digital" in English) card reader 14214; at least one communication interface 14215 allowing mobile station 142 to communicate with devices present in the communication network 1, such as, for example, the wireless access point devices 11, 12, 14, 16 and 18, the roaming management device 100 or the audio and/or visual contents transfer supervision device 150.

The processor 14211 can execute instructions loaded into RAM 14212 from ROM 14213, external memory (not shown), storage medium (such as an SD card), or a communications network. When the mobile station 142 is powered up, processor 14211 can read instructions from RAM 14212 and execute them. These instructions form a computer program causing the implementation, by the processor 14211, of part of a method described in relation to FIG. 2.

All or part of the method implemented by the mobile station 142, or its variants described, can be implemented in software form by executing a set of instructions by a programmable machine, for example a DSP (Digital Signal Processor" in English) or a microcontroller, or be implemented in hardware form by a machine or a dedicated component, for example an FPGA ("Field-Programmable Gate Array") or an ASIC ("Application-Specific Integrated Circuit" in English). In general, the mobile station 142 includes electronic circuitry configured to implement the method described in relation to itself as well as to the wireless access point devices 11, 12, 14, 16 and 18, the roaming management device 100 of the communication network 1, the audio and/or visual content transfer supervision device 150, and any other device involved in performing the roaming management method described. Of course, the mobile station 142, further comprises all the elements usually present in a system comprising a control unit and its peripherals, such as a power supply circuit, a supervision circuit supply, one or more clock circuits, a reset circuit, input-output ports, interrupt inputs, bus drivers. This list is obviously not exhaustive.

The invention is not limited to the embodiments and examples described above but more generally relates to any method for managing the roaming of a mobile station in a communication network, the mobile station transferring audio and/or visual content from a remote audio and/or visual content server connected to said network via a buffer memory (known as a "buffer") and being configured to trigger a sending of first information, to a roaming management device of the communication network, when the filling level of the buffer memory is insufficient to guarantee a correct and proper rendering of the audio and/or visual content during roaming between two wireless access points of the communication network, and to trigger a sending of a second piece of information, to the roaming management device of the communication network, when the filling level of the buffer memory is sufficient to guarantee a correct and proper rendering of the audio and/or visual content while roaming between two wireless access points in the communication network.

In particular, the roaming management device 100 and the audio and/or visual content transfer supervision device 150 can be embedded in separate equipment. Furthermore, the invention is not limited to the context of a local home network and IEEE802.11 technologies. The roaming management device 100, just like the transfer supervision device 150 of audio and/or visual contents, can each be a separate equipment of a mobile network communication of one type among the 3G (e.g. UMTS, CDMA200), 4G (e.g. LTE, LTE-Advanced, WiMAX) or 5G (e.g. 5G NR, 5G-Advanced) types. Thus, according to a variant embodiment, the wireless access points can each be communication relays of a communications network of one type among the 3G, 4G or 5G types, the mobile stations can each be compatible with a communication network of one of 3G, 4G or 5G types and the roaming management and content transfer supervision devices can be configured to respectively operate mobile station roaming management and content transfer supervision functions, in networks architectures respectively compatibles with such type of communication network.

The invention claimed is:

1. A method for handling the roaming of a mobile station connected to a wireless access point among a plurality of wireless access points of a communication network, the mobile station being configured to operate a reception of an audio and/or visual content from a remote server of audio and/or visual contents connected to the communication network and to operate a rendering of the audio and/or visual content, the audio and/or visual content transiting, between the reception and the rendering, via a data reception buffer of the mobile station, the method being executed in at least a device connected to the communication network and wherein the method comprises:

triggering a sending, to a roaming management device of the communication network, of a first piece of information according to which roaming of the mobile station is prohibited, when a first quantity of data available in the reception buffer, lower than a first predetermined threshold, is detected, then, triggering a sending, to the roaming management device, of a second piece of information according to which roaming of the mobile station is authorized, when a second quantity of data available in the reception buffer, greater than a second predetermined threshold, is detected.

2. The method for handling the roaming of a mobile station according to claim 1, wherein the device is the mobile station or wherein the device is the remote server.

3. The method for handling the roaming of a mobile station according to claim 1, wherein:

the sending of the first piece of information to the roaming management device is broken down in:

a sending, to a transfer supervision device of audio and/or visual contents in the communication network, of a piece of information according to which the first quantity of data available in the reception buffer, less than a predetermined threshold, is detected, and, a sending, from the transfer supervision device of audio and/or visual contents in the communication network, to the management roaming device, of the first information according to which roaming of the mobile station is prohibited, and the sending of the second piece of information to the roaming management device is broken down in:

a sending, to a transfer supervision device of audio and/or visual contents in the communication network, of a piece of information according to which the second quantity of data available in the reception buffer, greater than a predetermined threshold, is detected, and, a sending, from the transfer supervision device of audio and/or visual contents in the communication network, to the management roaming device, of the second information according to which roaming of the mobile station is authorized.

4. The method for handling the roaming of a mobile station connected to a wireless access point among a plurality of wireless access points of a communication network, the mobile station being configured to operate a reception of an audio and/or visual content from a remote server of audio and/or visual contents connected to the communication network and to operate a rendering of the audio and/or visual content, the audio and/or visual content transiting, between the reception and the rendering, via a data buffer of the mobile station, the method comprising a method according to claim 1 and further comprising the following steps, executed in the roaming management device:

receiving the first information according to which roaming of said mobile station is prohibited, then, inhibiting an ability of the mobile station to roam in the communication network for a predetermined duration or until reception of the second information according to which a roaming of the mobile station is allowed, then, authorizing the mobile station to roam in the communication network.

5. The method according to claim 4, wherein the step of inhibiting an ability of the mobile station to roam in the communication network comprises:

identify one or more wireless access points of the communication network located within range of the mobile station, different from the wireless access point to which the mobile station is connected, triggering, upon receipt of the first information, the sending of a first configuration message, to each of the identified wireless access point devices, comprising information according to which a connection of the mobile station to this wireless access point is not allowed, then, triggering, after the predetermined duration or upon receipt of the second information, the sending of a second message, to each of the identified wireless access point devices, comprising information according to which a connection of the mobile station to this point wireless access is allowed.

6. A non-transitory computer-readable storage medium storing a computer program product comprising program code instructions for executing the steps of the method according to claim 1, which when the program is executed by a processor of the device connected to the communication network and/or a processor of a roaming management device, cause the device connected to the communication network and/or the roaming management device to execute the respective steps of the method.

7. A device configured to be connected to a communication network, the communication network comprising a mobile station configured to be connected to a wireless access point among a plurality of wireless access points of a communication network, and configured to operate a reception of an audio and/or visual content from a remote server of audio and/or visual contents connected to the communication network and to operate a rendering of the audio and/or visual content, the audio and/or visual content transiting, between the reception and the rendering, via a data buffer of the mobile station, the device comprising electronic and electromagnetic circuits configured for:

triggering a sending, to a roaming management device of the communication network, of a first piece of information according to which roaming of the mobile station is prohibited, when a first quantity of data available in the buffer reservoir, less than a first predetermined threshold, is detected, and triggering a sending, to the roaming management device, of a second piece of information according to which roaming of the mobile station is authorized, when a second quantity of data available in the buffer, greater than a second predetermined threshold, is detected.

8. The device according to claim 7, wherein the device is the mobile station or the device is the remote server.

9. A system for handling the roaming of a mobile station connected to a wireless access point among a plurality of wireless access points of a communication network, the mobile station being configured to operate the reception of audio and/or visual content from a remote server of audio and/or visual contents connected to the communication network and to operate a rendering of the audio and/or visual content, the audio and/or visual content transiting, between the reception and the rendering, via a data reception buffer of the mobile station, the system comprising a device according to claim 6 and further comprising a roaming management device comprising electronic circuitry configured for:

receiving the first information according to which roaming of the mobile station is prohibited, and for:

inhibiting an ability of the mobile station to roam in the communication network for a predetermined duration or until receipt, from the device according to claim 7, of the second information according to which roaming of the mobile station is authorized.

10. A system for handling the roaming of a mobile station according to claim 9, further comprising an audio and/or visual content transfer supervision device configured to be connected in a communication network and to handle an audio and/or visual content transfer from an audio and/or visual content server connected to the communication network to at least one mobile station connected to the communication network, the audio and/or visual content transfer supervision device comprising a connection interface to the communication network and electronic circuits configured for:

receiving, from the at least a device connected to the communication network, information that a first quantity of data available in a reception data buffer the mobile station for receiving the audio and/or visual content, below a predetermined threshold, is detected, and for:

sending, to a roaming management device, a first piece of information according to which roaming of the mobile station in the communication network is prohibited, the audio and/or visual content transfer supervision device further comprising electronic circuits configured to:

receiving, from the device connected to the communication network, information that a second quantity of data available in the reception data buffer of the mobile station, for receiving the audio and/or visual content, greater than a predetermined threshold, is detected, and for:

sending, to the roaming management device, a second piece of information according to which roaming of the mobile station in the communication network is authorized.

11. A system for handling the roaming of a mobile station according to claim 10, wherein the roaming management device and the audio and/or visual content transfer supervision device are included in a same equipment.

12. A system for handling the roaming of a mobile station according to claim 10, wherein the roaming management device and the audio and/or visual content transfer supervision device are respectively embedded in separate equipment.

13. A system for handling the roaming of a mobile station according to claim 12, wherein the roaming management device and the audio and/or visual content transfer supervision device are each embedded in an equipment of a communication network configured to operate communications according to a set of standards and interoperability protocols comprising one from a group comprising among 3G, 4G and 5G.

14. A system for handling the roaming of a mobile station according to claim 10, wherein the roaming management device and the audio and/or visual content transfer supervision device are included in a same equipment, of the home gateway type.

15. An audio and/or visual content transfer supervision device configured to be connected in a communication network and to handle an audio and/or visual content transfer from an audio and/or visual content server connected to the communication network to at least one mobile station connected to the communication network, the audio and/or visual content transfer supervision device comprising a connection interface to the communication network and electronic circuits configured for:

receiving, from the at least a device connected to the communication network, information that a first quantity of data available in a reception data buffer the mobile station for receiving the audio and/or visual content, below a predetermined threshold, is detected, and for:

sending, to a roaming management device, a first piece of information according to which roaming of the mobile station in the communication network is prohibited, the audio and/or visual content transfer supervision device further comprising electronic circuits configured to:

receiving, from the device connected to the communication network, information that a second quantity of data available in the reception data buffer of the mobile station, for receiving the audio and/or visual content, greater than a predetermined threshold, is detected, and for:

sending, to the roaming management device, a second piece of information according to which roaming of the mobile station in the communication network is authorized.

* * * * *